No. 707,810. Patented Aug. 26, 1902.
R. J. WENKER.
DENTAL FORM FOR HOLDING TEETH.
(Application filed Jan. 11, 1902.)
(No Model.)

Witnesses:
F. Otto
C. L. Roesch.

Inventor
Raymond J. Wenker
By Erwin & Wheeler
Attorneys.

UNITED STATES PATENT OFFICE.

RAYMOND J. WENKER, OF MILWAUKEE, WISCONSIN.

DENTAL FORM FOR HOLDING TEETH.

SPECIFICATION forming part of Letters Patent No. 707,810, dated August 26, 1902.

Application filed January 11, 1902. Serial No. 89,254. (No model.)

*To all whom it may concern:*

Be it known that I, RAYMOND J. WENKER, a citizen of the United States, residing at Milwaukee, county of Milwaukee, and State of Wisconsin, have invented new and useful Improvements in Dental Forms for Holding Teeth, of which the following is a specification.

My invention relates to improvements in a so-called "dummy jaw" or "dental form" for holding teeth while doing experimental work and for demonstrating purposes; and it pertains especially to the peculiar construction of the device by which each tooth is provided with a separate recess or socket.

My invention is explained by reference to the accompanying drawings, in which—

Figure 1:
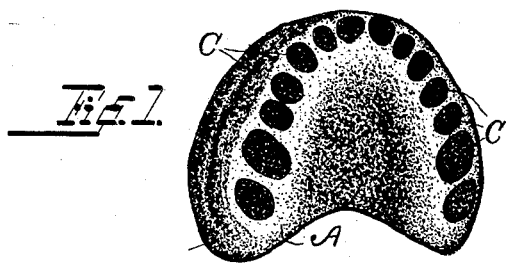
Figure 2:
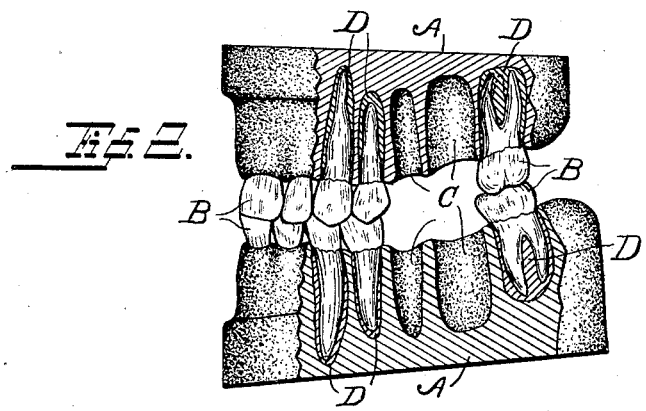
Figure 3:
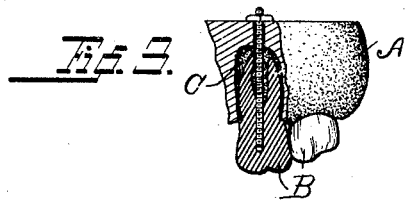

Figure 1 represents a perspective view of the form for the upper set of teeth. Fig. 2 is a vertical section through one side of both upper and lower dental forms. Fig. 3 is a detail showing the manner of holding a tooth in the form by a metallic fastening.

Like parts are identified by the same reference-letters throughout the several views.

A represents the so-called "dummy jaw" or "dental form" in which the teeth B are secured. The jaw or form A as put upon the market is provided with a series of sockets or recesses C C. The sockets or recesses C may vary in number, size, and shape to conform substantially to the number, size, and shape of the respective teeth to be located therein. It will of course be obvious that such forms may be made of glue or any other material which is sufficiently flexible and firm to answer the purpose for which the jaw is designed. It is also obvious that a variety of substances or compounds might be employed for holding the teeth in their sockets, such as glue, sealing-wax, plaster-of-paris, or any substance or material which will hold the teeth sufficiently rigid while they are being drilled, cleaned, filled, regulated, or otherwise operated upon.

While the dummy jaws employed preferably conform in shape substantially to the shape of the human jaw, the form or contour may be changed or varied without departing from the spirit or essence of my invention.

Having thus described my invention, what I claim as new, and desire to secure by Letters Patent, is—

1. As a new manufacture, a so-called dummy jaw or dental form for demonstrating or experimental purposes, provided with a plurality of recesses or sockets for the reception of the roots or covered portions of teeth, substantially as set forth.

2. As a new manufacture, a so-called dummy jaw or dental form for demonstrating or experimental purposes, provided with a plurality of recesses or sockets for the reception of the roots of teeth; teeth located in said sockets or recesses; and means for retaining said teeth in their sockets as set forth.

3. As a new manufacture, a dummy jaw or dental form for demonstrating or experimental purposes, provided with a plurality of sockets or recesses for the reception of the roots of teeth; teeth located in said sockets or recesses; and a packing of adhesive material interposed between the walls of said sockets and the teeth therein, and adapted to adhere to and rigidly retain said teeth in their respective sockets, as set forth.

4. As a new manufacture, a dummy jaw or dental form for demonstrating or experimental purposes, formed of flexible material and provided with a series of sockets or recesses for the reception of the roots of teeth; teeth located in said sockets or recesses; and means for retaining said teeth in their sockets, substantially as set forth.

In testimony whereof I affix my signature in the presence of two witnesses.

RAYMOND J. WENKER.

Witnesses:
JAS. B. ERWIN,
C. L. ROESCH.